United States Patent [19]
Nguyen et al.

[11] Patent Number: 5,609,663
[45] Date of Patent: Mar. 11, 1997

[54] GLASS OR PLASTIC CONTAINER MANUFACTURING SYSTEM

[75] Inventors: Can Nguyen, Longmeadow, Mass.; Timothy J. Liska, W. Simsbury, Conn.

[73] Assignee: Emhart Glass Machinery Investments Inc., Wilmington, Del.

[21] Appl. No.: 300,883

[22] Filed: Sep. 6, 1994

[51] Int. Cl.⁶ .................................................... C03B 9/40
[52] U.S. Cl. ................ 65/160; 364/473.02; 65/DIG. 13; 425/162; 425/125
[58] Field of Search .................. 65/DIG. 13; 364/473, 364/476, DIG. 1; 395/200.01, 200.11, 600; 425/162, 135; 264/40.1; 379/219

[56] References Cited

U.S. PATENT DOCUMENTS 5,185,860  2/1993  Wu ..................................... 395/200.11

Primary Examiner—Donald E. Czaja
Assistant Examiner—Calvin Padgett
Attorney, Agent, or Firm—Spencer T. Smith

[57] ABSTRACT

A system for manufacturing glass and plastic containers is disclosed which has at least two computers connected by a network or more than one network. Each computer has a local virtual network process which establishes a connection with the other node, notifies that other node when its database(s) are open or closed and establishes a connection of its own database(s) so that a node can transparently communicate with any other node on its network or on any connected network.

3 Claims, 2 Drawing Sheets

GLASS OR PLASTIC CONTAINER MANUFACTURING SYSTEM

The present invention relates to systems which manufacture glass or plastic containers. Such systems may include machines which form the containers, feeders which deliver the required input to these machines and inspection machines which verify the quality of the formed containers.

In state of the art glass container manufacture, the ingredients which define glass are melted and then conditioned in a forehearth, such as disclosed in U.S. Pat. No. 4,680,051, to define a uniform molten glass temperature. The forehearth delivers the molten glass to a feeder such as disclosed in U.S. Pat. No. 4,551,163, which discharges a continuous shaped runner or runners of molten glass. A shear mechanism cuts the runner(s) into discrete gobs and these gobs are delivered by a gob distributor, such as disclosed in U.S. Pat. No. 4,599,101, to tracks which deliver the gob(s) to individual sections of an I.S. machine, such as disclosed in U.S. Pat. No. 4,685,947. Containers formed by a section of this machine are pushed onto a conveyor by a pusher mechanism such as shown in U.S. Pat. No. 4,705,552. These containers may then be inspected for quality by an inspection machine such as disclosed in U.S. Pat. No. 4,490,800. Each of these mechanisms and machines may be controlled by one or more computers and each of these computers can be referred to as a node. For example, a conventional 12 section I.S. machine may have a computer controlling each section and a machine supervisory computer and the pusher shear, gob distributor forehearth and feeder may each have a single computer.

Each computer may have one or more databases which are accessed via an entry in that computer. A network (LAN-Local Area Network, WAN-Wide Area Network) connects these computers. In such networks, a collection of data is established that can be accessed in whole or in part by the individual computers on the network. The computers within an environment (domain) may be on a number of networks that have different platforms. GATEWAYS make it possible for a computer (node) on one platform to access data from such a collection of data which is on a different platform. Such access is often unidirectional and the gateway translates the data from one platform to another platform. The GATEWAY acts as a central data server for one networks data for nodes on another network. The information concerning the location of the data must be stored in the GATEWAY. Such a gateway is disclosed in copending U.S. Ser. No. 08/196,307, U.S. Pat. No. 5,475,601, filed Feb. 15, 1994, and assigned to the assignee of this application.

It is accordingly an object of the present invention to provide transparent communication from any node (computer) in an environment or domain to any other node either on the same network or on any other network in the domain.

Other objects and advantages of the present invention will become apparent from the following portion of this specification and from the accompanying drawings which illustrate, in accordance with the mandata of the patent statutes a presently preferred embodiment incorporating the principles of the invention.

REFERRING TO THE DRAWINGS

Figure 1:
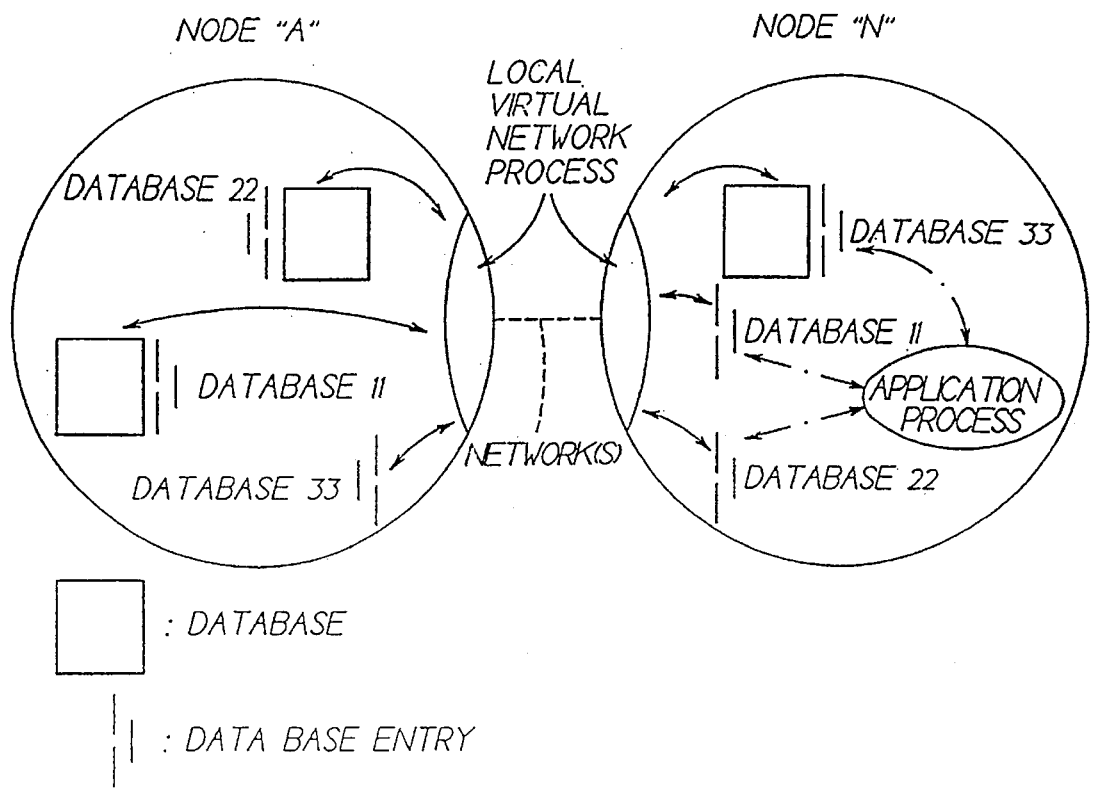
FIG. 1 is a schematic representation of the disclosed invention.
Figure 3:
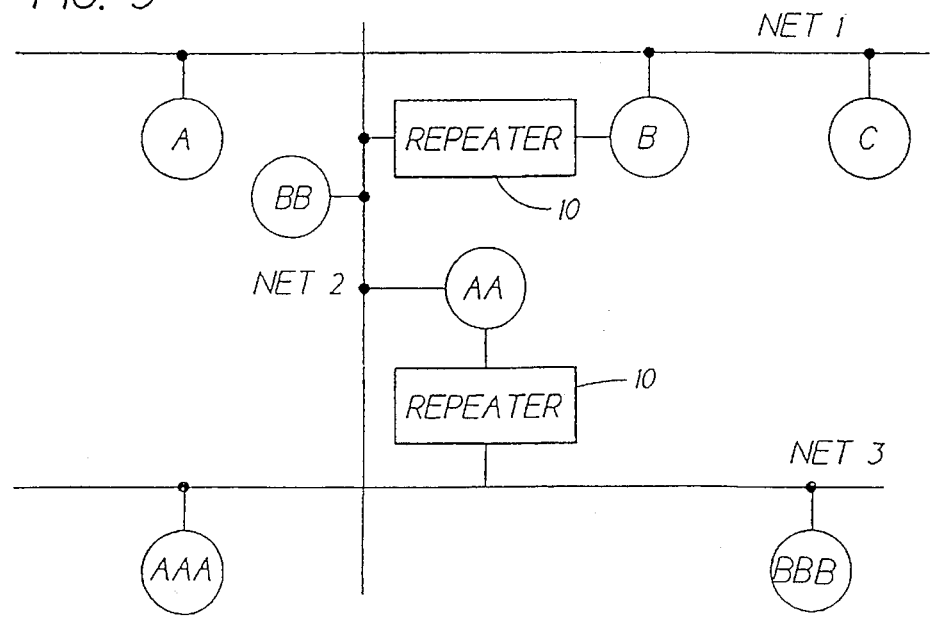
FIG. 3 is a schematic drawing showing how the invention can be used in a multi network domain.

FIG. 1 shows two nodes (A and N). A node is a computer which has one or more databases. The two nodes are either on the same network or on different networks. As shown, node A has two databases identified as database 11 and database 22 and can represent any two devices within the system environment (domain) such as an I.S. machine and a shear mechanism for that machine. Node N which can be any other node on the same network or on any other network in the domain has a single database—database 33 which could represent other devices within the system such as a forehearth or an inspection machine. To access a database, a process must go through a database entry. A local database entry for each database is conventionally created on the node in which the database resides and is created and destroyed with that database. Coincidentally, a virtual database entry is created for each local database on the other nodes in the domain by the LVNP (as described in the following paragraph). Its functionality to all application processes is identical to its sibling, the local database entry.

To establish direct transparent communication from any node (computer) to any database in any other node, a Local Virtual Network Process (LVNP) is located in each node. The LVNP has four main functions:

1. to establish a connection with all the other LVNP'S residing on nodes in its domain;

2. to notify other LVNP'S in the domain to create and destroy virtual database entry(s) when a database in the node in which it resides opens or closes;

3. upon notification from other LVNP(s) on in the domain, create or destroy virtual database entries in its node; and 4. to maintain communication between the database(s) which reside in the same node and all of its virtual database entries that appear on all the nodes in the domain.

The LVNP along with other LVNP's in the domain automatically and dynamically create connections among the LVNP'S in the domain. This process is independent of the processes that access the databases. In order to automatically establish connections among themselves, the LVNP'S must use an addressing scheme. The address could be, but is not limited, to the combination of all the addresses from all intermediate nodes. The local virtual network process broadcasts a connection packet to all nodes belonging to its domain. The LVNP in the receiving node(s) creates a data entry point in its node completing the connection process. The connection process involves creating an address that is used by the database entry to route data to its associated database. If the receiving LVNP detects more than one physical network connection in its node, it will propagate the packet with its node address appended to the packet. To enable a transparent connection from one node in one network to a node in any other network, a data repeater function is required within the node. At least one of the nodes on the first network has to be physically connected to the second network and must also perform the repeating function. With this approach, the new on-line database can be transparently accessed from all nodes that belong to its domain and this may be comprised of multiple physical networks.

Example of establishing a connection across networks as a result of a new database process "11" started on node A (FIG. 2):

- At B, a virtual database entry "11" has the connecting address such as: \B\A

- At C, a virtual database entry "11" has the connecting address such as: \C\A

- At BB, a virtual database entry "11" has the connecting address such as: \BB\B\A
- At AA, a virtual database entry "11" has the connecting address such as: \AA\B\A
- At AAA, a virtual database entry "11" has the connecting address such as: \AAA\AA\B\A
- At BBB, a virtual database entry "11" has the connecting address such as: \BBB\AA\B\A In the preferred embodiment, there are three different networks in the environment or domain; NET1, NET2, NET3. Nodes A, B and C are on one network NET1, AA, and BB are on the second network NET2, and Nodes AAA and BBB are on the third network NET3. Additionally, while Node B is on the first network NET1, it could also be on the second network NET2 and while Node AA is on the second network NET2, it could also be on the third network NET3.

Figure 2:
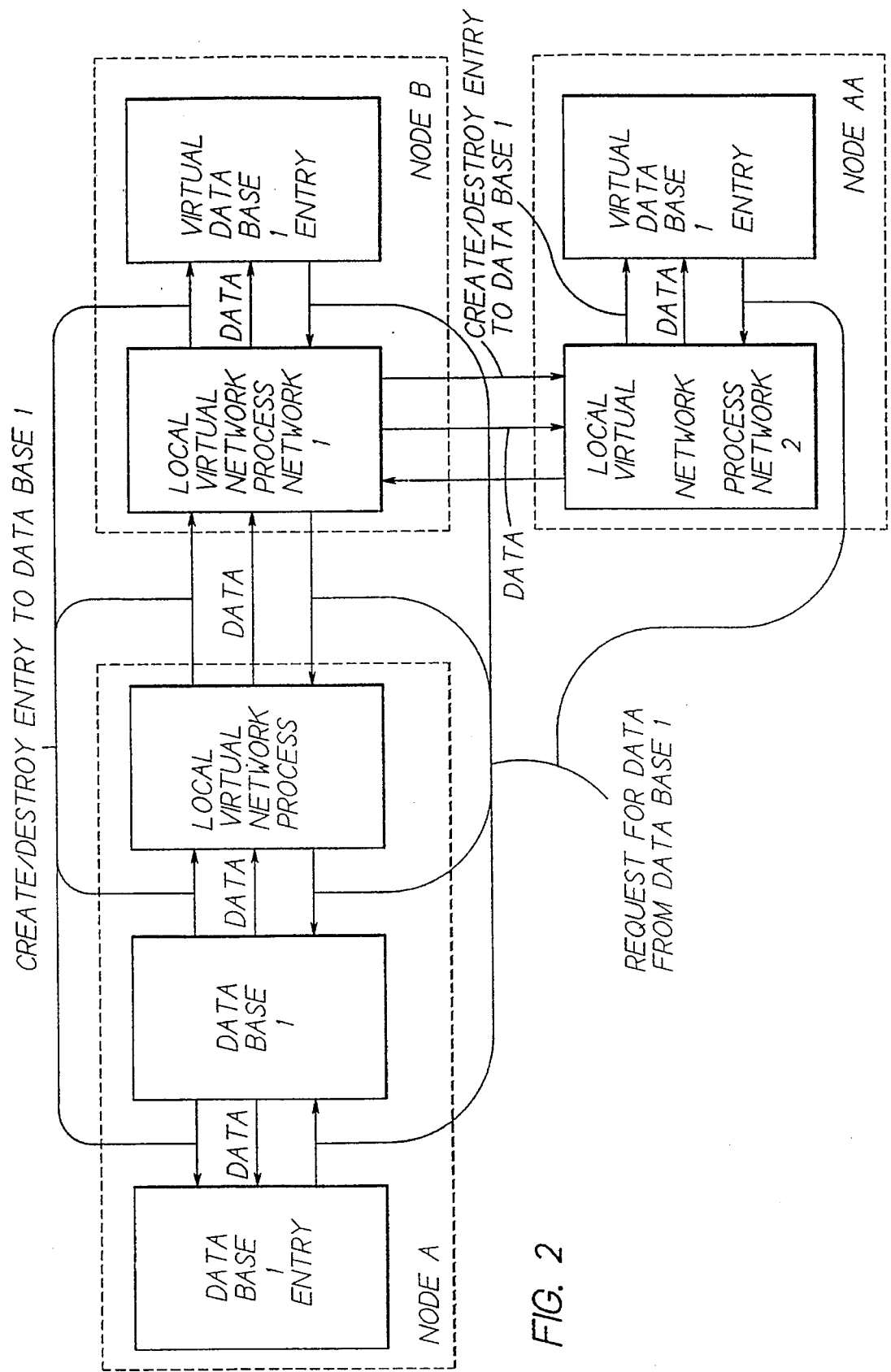
FIG. 2 is a schematic drawing illustrating the operation of the local virtual network processes.

As shown in FIG. 2, one Repeater 10 bridges or connects Node B, which is on the first network NET1 to the second network NET2 and a second Repeater 10 bridges or connects Node AA which is on the second network NET2 to the third network NET3. The repeaters are bidirectional. While the repeaters are shown outside of their associated node (AA, B), they could be a part of the associated node.

Each node within the domain can accordingly have multiple database processes since when a database process is running, it connects to the local virtual network process. The virtual network process on each node creates a virtual database entry to make available the new database.

We claim:

1. A system for manufacturing glass or plastic containers such as an I.S. machine and an associated shear mechanism comprising:

a plurality of nodes, network means for connecting said plurality of nodes, each of said nodes including a local virtual network process for
 a) notifying all of the other local virtual network processes when a database is opened or closed in its node,
 b) creating or destroying a local virtual database entry when notified that a database has been opened or closed in another of said nodes,
 c) establishing a connection with any other of said nodes, and
 d) maintaining communication between any database on its node and each of said local virtual database entries.

2. A system for manufacturing glass or plastic containers according to claim 1, wherein said network means comprises a first network and a second network, said plurality of nodes includes at least one node on said first network and at least one node on said second network, and said one node on said first network includes repeater means.

3. A system for manufacturing glass or plastic containers according to claim 2, wherein said network means comprises a third network, said plurality of nodes includes at least one node on said third network, and said one node on said second network includes repeater means.

* * * * *